United States Patent [19]
Mandel

[11] Patent Number: 4,582,211
[45] Date of Patent: Apr. 15, 1986

[54] PRESSURIZED CONTAINER OF COMPOUND MATERIAL

[75] Inventor: Goetz Mandel, Kirchseeon, Fed. Rep. of Germany

[73] Assignee: Messerschmitt-Boelkow-Blohm Gesellschaft mit beschraenkter Haftung, Munich, Fed. Rep. of Germany

[21] Appl. No.: 599,555

[22] Filed: Apr. 12, 1984

[30] Foreign Application Priority Data

May 6, 1983 [DE] Fed. Rep. of Germany ... 3316539

[51] Int. Cl.⁴ .............................................. B65D 6/02
[52] U.S. Cl. ..................................... 220/3; 220/1 B; 220/414
[58] Field of Search .................. 220/1 B, 3, 288, 414

[56] References Cited

U.S. PATENT DOCUMENTS

| | | | |
|---|---|---|---|
| 3,121,451 | 2/1964 | Schuerch | 220/3 X |
| 3,293,860 | 12/1966 | Stedfeld | 60/263 |
| 4,318,491 | 3/1982 | Nelson et al. | 220/1 B |
| 4,475,662 | 10/1984 | Mandel | 220/3 |

Primary Examiner—Steven M. Pollard
Attorney, Agent, or Firm—W. G. Fasse; D. H. Kane, Jr.

[57] ABSTRACT

A pressurized container of compound material, such as fiber compound material for holding a pressurized fluid in said container has a torus shaped body with a fluid tight inner container member and an outer supporting winding shell for relieving the inner container member of stress. The outer winding shell is made, for example, of fibers, threading or wires forming the winding and held together by a binding agent such as a resin or epoxy resin. The torus shaped body has a gusset type angular shape along or around its small inner circumference, whereby a furrow is formed. A further support winding (6) is located in said furrow around the small circumference and extends normal to the meridian. The supporting winding shell (5) extending around the torus shaped body and the further support winding (6) extending around the small circumference of the torus shaped body cooperate in achieving an optimal stress distribution and thus a very advantageous load distribution between the inner container member and the outer supporting winding shell.

10 Claims, 4 Drawing Figures

PRESSURIZED CONTAINER OF COMPOUND MATERIAL

FIELD OF THE INVENTION

The invention relates to a pressurized container of compound material, especially a container having a torus shaped body made of a fiber compound material or a thread or wire compound material. In such compound materials the reinforcing fibers, or threads or wires are embedded in a binding agent such as as suitable resin matrix or the like.

DESCRIPTION OF THE PRIOR ART

A container of the just mentioned type for holding fluids under pressure has been disclosed in U.S. Pat. No. 4,475,662. Such a pressure container has a torus shaped body, but in the zone of its equator it has a cylindrical outer contour which is reinforced by an additional support winding extending normal to the meridian.

The cylindrical outer contour and the additional support winding in the equator zone assure an optimal winding application and the desired strength that such lightweight torus containers must have. However, the cylindrical outer contour has its limitations in that such containers cannot be used for all purposes, for example.

U.S. Pat. No. 3,293,860 discloses a container for holding a fluid under pressure and the container is equipped with connector means such as inlet and/or outlet ports for filling and/or empty-ing such containers. Such connector means may also include handles or the like.

OBJECTS OF THE INVENTION

In view of the above it is the aim of the invention to achieve the following objects singly or in combination:

to construct a torus shaped pressurized container which is not limited to a cylindrical equatorial zone and which nevertheless is lightweight and capable of holding substantial internal pressure;

to take full advantage of the so-called breaking length of the reinforcing materials such as synthetic fibers, threads, or wires in the construction of such pressurized containers;

to avoid the problems of over-concentration of the reinforcing material, for example at the pole caps of prior art containers; and to construct an inner container member and the outer support winding shell in such a manner that an optimal load distribution is achieved so that the inner fluid tight container also participates in taking up at least part of the load while simultaneously functioning as a winding core and a sealing for the external winding shell.

SUMMARY OF THE INVENTION

A pressurized container having a torus shaped body of compound material for holding a pressurized fluid includes an inner flud tight container member and an outer winding shell surrounding the inner fluid tight container member for supporting the latter. Connector means such as inlet and/or outlet nipples or ports and-/or holding members or handles or the like are secured to the container. The torus shaped body has a large and a small circumference relative to the torus center and accordingly, a large and small diameter. Such a container has been improved according to the invention in that the meridional planes through the torus shaped body have a gusset type angular shape along the small torus circumference forming a furrow along the small torus circumference. A further supoort winding in addition to the outer shell winding is located in the furrow and extends substantially perpendicularly or normal to the meridional planes for reinforcing the container along its small circumference.

It has been found that by providing the meridional planes of torus shaped container bodies with a reinforced gusset shape, the advantageous characteristics of torus shaped containers having an oval meridional curvature have been substantially improved. In torus shaped bodies having meridional planes of completely oval curvature additional stress occurs in the zone of the smallest diameter or circumference. Such additional stress is now completely under control by the gusset shape in the small diameter, or rather small circumferential zone. The angular or furrow shape forms with the oval an endless meridional curvature. The additional support winding which extends preferably exclusively perpendicularly to the meridional plane utilizes the tension characteristics in this zone in an advantageous way.

The features of the invention permit constructing a pressurized container of extremely light weight which fully utilizes the high break length of the reinforcing material such as a fiber material which requires only a small proportion of binding agent such as an embedding resin matrix without the need for heavily constructed connector nipples or sockets and without the need for polar caps. Another advantage of the present structure is seen in that the problems encountered with different container shapes resulting from the concentration of the reinforcing material such as the reinforcing fibers in the pole cap zones have been avoided.

Another advantage of the invention is seen in that the load proportion that now may be taken up by the outer support winding shell may now be larger, relative to the load proportion taken up by the inner fluid tight container member, than was possible heretofore. This larger load take up by the outer support winding shell is now possible independently of any other limitations to which prior art containers may have been subject, for example the fiber concentration in the pole caps. According to the invention the inner fluid tight container member may take up about 20% of the entire load or stress while the remaining 80% are taken up by the outer support winding shell. Simultaneously, the inner container member functions as winding core and as a seal for the outer support winding shell. These advantages have been made possible because the inner container has been adapted fully in its shape to the stress conditions to which the entire torus shaped container body is exposed.

By using the inner fluid tight container member, for example in the form of an inner tube or rubber bubble, it is now possible to manufacture the outer support winding shell in a continuous winding operation because it is no longer necessary to remove a winding core when a winding of the outer shell is completed as has been necessary heretofore, also for the purpose of the subsequent insertion of the inner tube or rubber bubble.

Another advantage of the invention is seen in that the above mentioned connector means such as inlet and/or outlet nipples and/or handles or the like can be integrated directly into the winding structure without diminishing in any way the strength of the pressurized container. These connector means or members such as nipples, handles, or the like may be secured to reinforcing ribs or spars which replace the outer winding shell between adjacent meridional planes and which extend in the direction of the meridian, that is, all around the torus shaped body. Another possibility of securing such nipples, handles or the like is to integrate reinforcing lugs or splice straps directly into the outer winding shell and to connect the connectors through these lugs or straps. Preferably, the lugs or straps are arranged in a zone of small density of the reinforcing material such as fibers, threads, or wires which means that the lugs or straps are located in the outer support winding shell where it has its maximum diameter, namely around the outer circumference. The reinforcing lugs may be integrated into the outer winding shell by modifying the outer windings into a cross-over winding arrangement passing over the shoulders of the reinforcing lugs, whereby the cross-over winding replaces the regular winding along the meridian in this zone where the reinforcing lug is located. The reinforcing splice straps are also part of the outer winding shell and are spliced into the outer winding shell so that the strap or straps from an extension of the outer winding shell.

BRIEF FIGURE DESCRIPTION

In order that the invention may be clearly understood, it will now be described, by way of example, with reference to the accompanying drawings, wherein.

Figure 1:
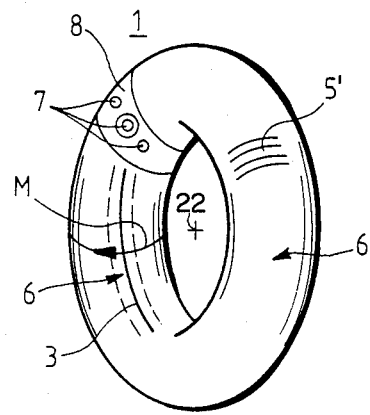
FIG. 1 is a perspective view of a pressurized container according to the invention having a torus shaped body.
Figure 3:
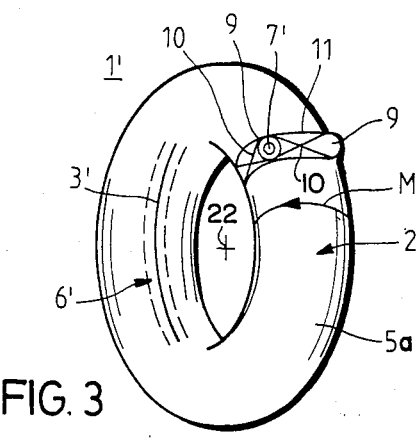
Figure 4:
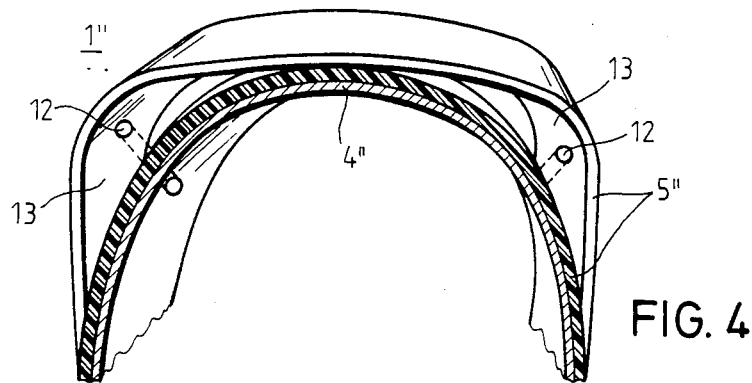

FIG. 3 is a perspective view similar to that of FIG. 1, but showing a second embodiment of a torus shaped pressurized container according to the invention; and FIG. 4 is a sectional view along a meridional plane and showing the sectioned portion of the torus shaped body in a perspective view for illustrating the position of connector elements for filling and emptying the container and also showing further connector elements forming handles for the container.

DETAILED DESCRIPTION OF PREFERRED EXAMPLE EMBODIMENTS AND OF THE BEST MODE OF THE INVENTION

Figure 2:
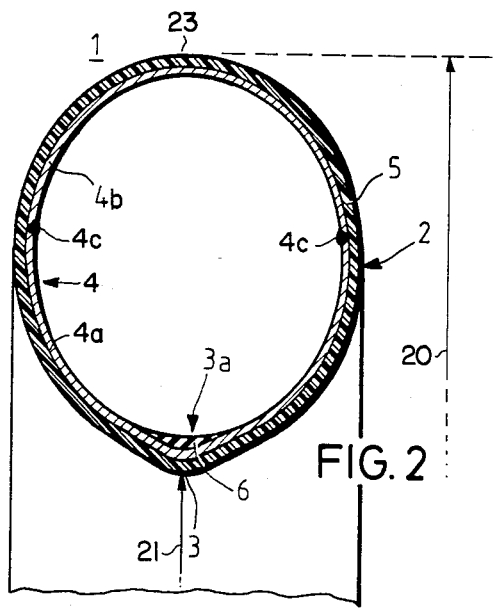
FIG. 2 is a sectional view through a meridional plane of the torus shaped body according to FIG. 1, said meridional plane extending through the center of the torus body.

FIGS. 1 and 2 show a pressurized container 1 having a torus shaped body 2 forming an endless ring having meridional planes M which can be extended through the torus center 22. Within the meridional planes M the torus shaped body according to the invention has a substantially oval cross-sectional curvature as best seen in FIG. 2, especially toward the equator zone 23 defined by the large diameter 20 of the torus shaped body. However, as taught by the invention, the cross-section curvature in the zone near the small diameter 21 has a gusset type angular shape 3 forming a furrow 3a as shown in FIG. 2. This furrow 3a forms a discontinuity or jump in the curvature which defines the cross-sectional meridional plane.

The container 1 comprises a fluid tight inner container member 4 which is, for example, an inner tube of metalic alloy (Mg—Al), which simultaneously functions as a winding core for the outer winding shell which surrounds the inner fluid tight container member for supporting it. The outer winding shell 5 comprises, or rather is made of, reinforcing fibers or windings 5', for example carbon fibers embedded in a suitable resin matrix. The fibers 5' forming the outer shell 5 run all around the torus shaped body 2. Only a few windings 5' are shown symbolically in FIG. 1. The fibers 5' and their embedding matrix are directly applied to the inner container member 4 and all the fibers, threads or the like run exclusively in the meridional direction M.

The fluid tight inner container member 4 comprises a radially inner section 4a and a radially outer section 4b which are welded or otherwise interconnected in a fluid tight manner along a seam 4c shown in FIG. 2. Prior to joining the two sections 4a and 4b to each other, a further support winding 6 is applied to the radially inner section 4a near the small diameter zone so that this winding 6 comes to rest in the furrow 3a as best seen in FIG. 2. The individual windings or turns of the winding 6 extend substantially perpendicularly to the meridional plane which means normal to the plane of the drawing of FIG. 2. In FIG. 1 only a portion of the radially innr zone or rather gussets 3 near the small diameter 21 is shown to be provided with the further windings 6. However, these windings 6 extend all around the gusset 3.

The material for forming the fluid tight inner container member 4 and the material of the supporting windings 5 and 6 is so selected that the respective elasticities provide the same absolute expansion or stretching under the occurring stress or load conditions. The inner container member 4 may be of a very lightweight construction since essentially it is required to have a strength just sufficient to function as the winding core for the supporting windings 5 and 6.

The torus shaped body constitutes an optimal configuration for the inner container member 4 and for the outer support windings 5 and 6. The outer support windings 5 and 6 and the inner container member 4 are all subject to nonuniform load or stress conditions and the torus shaped body is optimally adapted for such non-uniform load applications. Further, the torus body 2 has all the advantages of an endless torus body with regard to the application of the windings of the outer support shell 5. Specifically, the concentration of reinforcing fibers or the like in pole caps is avoided. Further, concentrations of windings with a high binding agent content are also avoided. This type of structure is easily manufactured by a continuous winding of the fibers or threads 5' forming the outer support shell 5 and the finished product has a uniform expansion or stretching in any direction and at any location. The tangential and meridional tensile vectors in the wall of the inner container member 4 under load conditions are thus constant and the tensile or stress loads in the reinforcing fibers in the shell 5 and in the further support winding 6 are constant. Yet another advantage is seen in that the high break lengths of the fiber material such as carbon fibers can be optimally utilized in such a container shape.

As shown in FIG. 1 the container 1 comprises a plurality of connector elements 7, for example, for securing the container to a structure and/or for filling and/or emptying the container with a fluid. Thus, these connector members 7 may be in the form of nipples or inlet and/or outlet ports or they may be in the form of a threaded member suitable for connecting the container to a structure. These connector members 7 are arranged in or on reinforced or reinforcing spars or ribs 8 surrounding the inner container member 4 and taking in this zone the place of the respective winding shell portion of the winding shell 5. Normally, there will be one or two of such reinforcing spars or ribs 8. Advantageously these spars or ribs 8 are stronger relative to the supporting winding shell 5, but the spars or ribs 8 are also formed as winding bodies and may be considered as being a reinforced part of the shell 5. The connector members 7 are secured by an adhesive bond in these spars or ribs 8 as they are being manufactured, for example, during the winding operation. These spars or ribs may also be made from prefabricated mats, whereby again the connector members 7 are incorporated into the mats prior to their curing or the like, whereby the curing of the resin matrix bonds the connecting members 7 to the spar 8.

FIG. 3 illustrates a pressurized container 1' corresponding substantially to that shown in FIG. 1, except that the connecting members 7' in FIG. 3 are secured to a reinforcing lug 9. The container of FIG. 3 also has a torus shaped body 2 with an outer support winding shell 5 and a gusset 3' in which the further reinforcing winding 6' is located. The reinforcing lugs 9 are located radially outwardly in the large diameter or large circumferential zone and are secured to the winding shell 5a by changing the regular winding into a cross-over winding 10 which secures the reinforcing lug 9 directly into the shell 5a when the synthetic resin matrix cures. Thus, in the zone 11 where the reinforcing lug 9 is located, the cross-over windings 10 take the place of the regular windings forming the shell 5a. The connector members such as emptying and/or filling nipples 7' are conventionally secured to the reinforcing lug 9.

FIG. 4 illustrates a sectional view through a portion of a further torus shaped body of a pressurized container 1" having an inner fluid tight container member 4" surrounded by an outer support winding shell 5" with the windings again directed in the meridional direction. Connecting members, for example in the form of filling nipples 12, are connected to the inner container member 4" and pass through the shell 5". A reinforcing splice strap 13 forming part of and being spliced into the outer winding shell 5" holds the nipples 12 in place. These splice straps 13 are located between two adjacent meridional planes and the splicing is accomplished by running certain of the reinforcing fibers of the shell 5" at a spacing from the other fibers forming the shell 5" as shown in FIG. 4. The splice straps 13 themselves may be pieces of a light metal, for example, aluminum or the like provided with bores for the insertion of the nipples 12.

Although the invention has been described with reference to specific example embodiments, it will be appreciated, that it is intended, to cover all modifications and equivalents within the scope of the appended claims. For example the container may be used for pressurized gases or liquids in space applications.

What is claimed is:

1. In a container having a torus shaped body of compound material for holding a pressurized fluid, including an inner fluid tight container member and an outer winding shell surrounding said inner fluid tight container member for supporting said inner fluid tight container member, and connector means operatively secured to said container, said torus shaped body having a large circumference and a small circumference relative to a torus center, the improvement comprising meridional planes (M) in said torus shaped body, said outer winding shell comprising windings extending exclusively around said meridional planes (M), said meridional plane (M) extending through the torus center and having a gusset type angular shape (3) along said small torus circumference forming a furrow (3a) along said small torus circumference, and wherein said inner fluid tight container member (4) comprises two sections (4a, 4b), and a further support winding (6) located in said furrow (3a) of one section (4a) of said two sections of said inner fluid tight container member (4) so that said fluid tight container member is sandwiched between said further support winding and said outer support winding shell (5) in said furrow (3a), said further support winding (6) extending exclusively perpendicularly to said meridional planes (M) for reinforcing said container along said small circumference.

2. The container of claim 1, further comprising a number of reinforced spar means (8) extending between two adjacent meridional planes instead of said outer winding shell, said connector means (7) being operatively secured to said reinforced spar means (8).

3. The container of claim 2, wherein said connector means comprise opening and closing means for filling and/or emptying said container.

4. The container of claim 2, wherein said connector means comprise at least one member for securing said container to a structure.

5. The container of claim 2, wherein said connector means comprise at least one handle for handling said container.

6. The container of claim 1, further comprising reinforcing lug means (9) arranged in a meridional zone (11) for securing said connector means (7') to said lug means, said outer winding shell comprising windings which are laid in a cross-over fashion on an outwardly facing shoulder of said reinforcing lug means for securing said reinforcing lug means in said outer winding shell, said outer winding shell comprising further windings extending around said meridional planes in regular non-cross-over fashion.

7. The container of claim 6, wherein said reinforcing lug means are located in a zone of small winding density of said outer winding shell and in a zone outside said large circumference.

8. The container of claim 1, further comprising splice strap means (13) forming part of and being spliced into said outer winding shell, said splice strap means being located between two adjacent meridional planes, said connecting means being arranged in said splice strap means.

9. The container of claim 8, wherein said splice strap means are located in a zone of small winding density of said outer winding shell and in a zone outside said large circumference.

10. The container of claim 1, wherein said meridional planes inside said torus shaped body are bounded by a meridional curve of such a configuration that any tangential stress is equal to any meridional stress in a wall of said inner fluid tight container member and that any tensile stress in said winding shell is constant.

* * * * *